(12) United States Patent
Bapu et al.

(10) Patent No.: US 11,829,761 B2
(45) Date of Patent: *Nov. 28, 2023

(54) SYSTEMS AND METHODS FOR HANDLING MACRO COMPATIBILITY FOR DOCUMENTS AT A STORAGE SYSTEM

(71) Applicant: Google LLC, Mountain View, CA (US)

(72) Inventors: Paneendra Anantha Rao Bapu, Bangalore (IN); Sowmith Manepalli, Hyderabad (IN); Sourav Poddar, Kolkata (IN); Abhay Garg, New Delhi (IN); Alexandre Ginet, Brooklyn, NY (US); Arijit De, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,074

(22) Filed: Jan. 4, 2023

(65) Prior Publication Data

US 2023/0146245 A1 May 11, 2023

Related U.S. Application Data

(63) Continuation of application No. 17/217,653, filed on Mar. 30, 2021, now Pat. No. 11,550,583.

(Continued)

(51) Int. Cl.
*G06F 9/30* (2018.01)
*G06F 8/30* (2018.01)
(Continued)

(52) U.S. Cl.
CPC .............. *G06F 9/3017* (2013.01); *G06F 8/31* (2013.01); *G06F 8/42* (2013.01); *G06F 8/437* (2013.01);
(Continued)

(58) Field of Classification Search
None
See application file for complete search history.

(56) References Cited

U.S. PATENT DOCUMENTS 5,274,821 A 12/1993 Rouquie
7,761,843 B2 7/2010 Ortscheid
(Continued)

FOREIGN PATENT DOCUMENTS

CA 3075627 A1 3/2019
CN 112230934 A 1/2021

OTHER PUBLICATIONS

'OLEFormat.ConvertTo method (Word)' from Microsoft Learn, Sep. 12, 2021. (Year: 2021).*

(Continued)

*Primary Examiner* — Steven G Snyder
(74) *Attorney, Agent, or Firm* — Lowenstein Sandler LLP

(57) ABSTRACT

A document to be stored on a network-based storage system is identified. The document includes one or more macros in a first programming language. An object referenced by a function defined by a macro of the one or more macros is identified. The function is converted into one or more sets of operations represented in a second programming language. Each set of operations corresponds to one of one or more candidate object types associated with the object. At least one of the one or more sets of operations is to be performed with respect to the object responsive to indication of a corresponding candidate object type for the object during execution of the macro. The document including the one or more sets of operations represented in the second programming language is stored on the network-based storage system.

20 Claims, 9 Drawing Sheets

Related U.S. Application Data

(60) Provisional application No. 63/113,394, filed on Nov. 13, 2020.

(51) Int. Cl.
  *H04L 67/1097* (2022.01)
  *G06F 8/41* (2018.01)
  *G06F 9/38* (2018.01)
  *G06F 8/51* (2018.01)
  *G06F 8/76* (2018.01)

(52) U.S. Cl.
  CPC ............... *G06F 8/51* (2013.01); *G06F 8/76* (2013.01); *G06F 9/3836* (2013.01); *H04L 67/1097* (2013.01)

(56) References Cited

U.S. PATENT DOCUMENTS

| | | |
|---|---|---|
| 8,453,126 B1 | 5/2013 | Ganelin |
| 8,549,489 B2 | 10/2013 | Ortscheid |
| 8,826,304 B2 | 9/2014 | Harm et al. |
| 11,061,652 B1 | 7/2021 | Biswas et al. |
| 2002/0004806 A1 | 1/2002 | Myers et al. |
| 2007/0005342 A1 | 1/2007 | Ortscheid |
| 2007/0044012 A1 | 2/2007 | Suver et al. |
| 2010/0257512 A1 | 10/2010 | Ortscheid |
| 2011/0041141 A1 | 2/2011 | Harm et al. |
| 2015/0020051 A1 | 1/2015 | Rabinovitch et al. |
| 2016/0210129 A1 | 7/2016 | Verlaguet |
| 2016/0357533 A1 | 12/2016 | De et al. |
| 2017/0277560 A1 | 9/2017 | Lucas et al. |
| 2018/0004489 A1 | 1/2018 | Proctor et al. |

OTHER PUBLICATIONS

'Mapping of SMIv2 Macros to IDL' from The Open Group, 2000. (Year: 2000).*

PCT International Search Report and Written Opinion for International Application No. PCT/US2021/057126, dated Feb. 4, 2022, 16 pages.

Macro Converter add-on overview' from Google, Nov. 5, 2020. (Year: 2020).

* cited by examiner

```
Dim a as variant      ← 310
b = a.value           ← 312
```

```
Dim a as variant      ◄── 410
b = myCollection(a)   ◄── 412
```

SYSTEMS AND METHODS FOR HANDLING MACRO COMPATIBILITY FOR DOCUMENTS AT A STORAGE SYSTEM

RELATED APPLICATIONS

This continuation application claims priority to U.S. patent application Ser. No. 17/217,653, filed on Mar. 30, 2021 and entitled "SYSTEMS AND METHODS FOR HANDLING MACRO COMPATIBILITY FOR DOCUMENTS AT A STORAGE SYSTEM," which claims priority to U.S. Provisional Patent Application No. 63/113,394, filed on Nov. 13, 2020 and entitled "SYSTEMS AND METHODS FOR HANDLING MACRO COMPATIBILITY FOR DOCUMENTS AT A STORAGE SYSTEM," which are incorporated by reference herein.

TECHNICAL FIELD

Aspects and implementations of the present disclosure relate to handling macro compatibility for documents at a storage system.

BACKGROUND

A document (e.g., a word processing document, a spreadsheet document, etc.) can include macros. A macro refers to a user-created automated task that is performed for the document by a document processing application on a client device. The client device can perform the automated task of the macro by executing a series of operations associated with the macro.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosure for converting macros of a document in a first programming language to a second programming language. A document to be stored on a network-based storage system is identified. The document is created using a first document processing application that uses a first programming language that is incompatible with the first network-based storage system. The document includes one or more macros in the first programming language. A semantic context for an object included in a macro defining a function to be performed with respect to the object is determined. In some embodiments, the object is determined, based on the semantic context of the object, to correspond to multiple object types. A set of candidate object types for the object is identified. The function defined in the macro is converted into multiple sets of operations represented in the second programming language. Each set of operations is associated with a candidate object type. A set of operations is to be performed with respect to the object responsive to receiving an indication of a candidate object type during execution of the macro. The document is stored on the network-based storage system, where the document includes the multiple sets of operations represented in the second programming language. The second programming language is compatible with the network-based storage system.

BRIEF DESCRIPTION OF DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
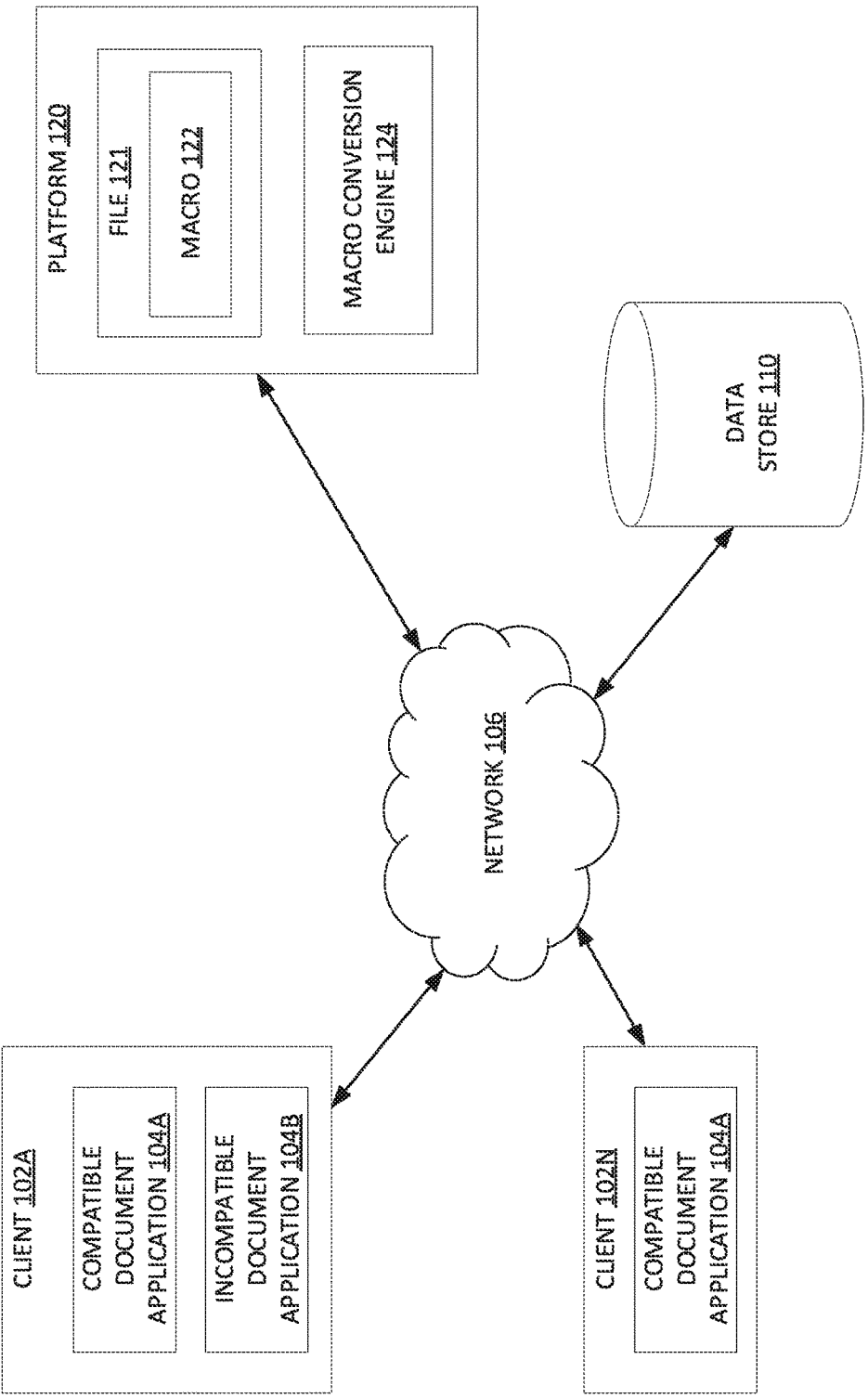
FIG. 1 illustrates an example system architecture, in accordance with implementations of the present disclosure.

Aspects of the present disclosure relate to handling macro compatibility for documents at a storage system. A network-based storage system can store documents that are accessible to users via multiple client devices. A user can provide, via a client device, a document for storage at the network-based storage system. After the document is stored at the network-based storage system, the user and/or other users can access the document at the network-based storage system via respective client devices (e.g., via a document application for the network-based storage system). In some instances, the user-provided document can include macros. A macro refers to a user-created automated task that is performed for the document by a document application (e.g., a document processing application) of a client device. In some instances, a macro can be in a programming language that is incompatible with the network-based storage system. For example, macros can be in a programming language (e.g., a Visual Basic for Applications (VBA) programming language), which is incompatible with a programming language (e.g., a Java Script programming language) supported by the network-based storage system.

In some instances, the network-based storage system cannot translate operations of the macros from the incompatible programming language to the compatible programming language (e.g., a corresponding operation in the programming language, which is compatible with the network-based storage system, does not exist, etc.). For example, the macro in the incompatible programming language can include an operation to be performed for a variant type object. A variant type object refers to an object that can be associated with multiple different object types. Alternatively, the compatible programming language may not support a variant type object. Therefore, the operations in the incompatible programming language cannot be translated to a corresponding operation in the compatible programming language.

In another example, the macro in the incompatible programming language can include an operation to perform a default function for an object. A default function refers to one or more sets of operations that are performed with respect to an object based on a type of the object. A macro invoking a default function does not explicitly reference the set of operations that is being invoked. The specific set of operations that is to be invoked for a default function in a macro is determined based on the type of the object that is referenced in the macro. In an illustrative example, objects of a macro can be associated with a class named "myCollection." The "myCollection" class can define default sets of operations that are to be performed for the default function based on the type of object referenced in the macro. For instance, the "myCollection" class can define a set of operations for an Item( ) function that is to be performed when an object having an integer object type is referenced by the macro even though the Item( ) function is not explicitly called in the macro. In some embodiments, the compatible programming language does not include default functions. Therefore, an operation to perform default function in the incompatible programming language cannot be translated to a corresponding operation in the compatible programming language.

As the network-based storage system cannot translate macros from the incompatible programming language to the compatible programming language, the document including the macros may be inaccessible to users via the network-based storage system. For example, a user of a client device can request access to a document that includes macros in an incompatible programming language via a document application for the network-based storage system at the client device. As the macros cannot be translated to the compatible programming language, the macros for the document can be inoperable at the client device and in some instances, the document can be completely inaccessible to the user. In some instances, the document application on the client device can attempt to execute operations of the macros in the incompatible programming language, but will be unsuccessful because the macro is not translated to the compatible programming language. This can result in a waste of computing resources at the client device and/or at the network-based storage system, which can cause an overall system latency to increase and an overall system efficiency to decrease.

Aspects of the present disclosure are directed to systems and methods for converting macros of a document from a programming language that is incompatible with (e.g., not supported by) a network-based storage system to a programming language that is compatible with (e.g., supported by) the network-based storage system. Converting the macros to the compatible programming language enables a document application for the network-based storage system to execute the macros originally in an incompatible programming language when the document is accessed by a user. A macro conversion engine executing on a processing device for the network-based storage system or a client device can identify a document to be stored on the network-based storage system. The document can be created using a document processing application that uses a programming language that is incompatible with the network-based storage system. The document can include macros that reference objects in the incompatible programming language and functions to be performed with respect to the object in the incompatible programming language. The macro conversion engine can determine a semantic context for an object (e.g., a definition for object or an indication of a user associated with the object) included in the macro. The macro conversion engine can determine, based on the semantic context of the object, that the object corresponds to a single object type or multiple object types.

In response to determining that the object corresponds to multiple object types, the macro conversion engine can identify a set of candidate object types for the object and convert the function of the macro into multiple sets of operations that each correspond to a candidate object type. For example, the macro conversion engine can determine that an object of a macro in an incompatible programming language corresponds a variant object type. The macro conversion engine can identify the set of candidate object types for the object based on definitions for the object included in files for the document and/or a database (e.g., a library) that includes identifiers for candidate object types for the object. The macro conversion engine can identify multiple sets of operations in the incompatible programming language that are to be performed for the object based on each candidate object type and can convert each set of operations in the incompatible programming language to a corresponding set of operations in the compatible programming language.

In response to converting the function in the macro into multiple sets of operations in the compatible programming language, the macro conversion engine can store the document including the multiple sets of operations in the compatible programming language at the network-based storage system. A client device for a user of the network-based storage system can transmit a request to access the document via a document application for the network-based storage system. The network-based storage system can provide access to the document via the document application, and the document application can execute the operations of the macro in the compatible programming language.

Aspects of the present disclosure handle macro compatibility for documents at a network-based storage system. The macro conversion engine identifies a set of candidate object types for an object and converts macro functions referencing the object into multiple corresponding operations in the compatible programming language. Aspects of the present disclosure therefore enable a document application for the network-based storage system to execute the same or similar macros for the document that are executed for the document when accessed via a document application in the incompatible programming language. As the document application can execute the converted macros for the document originally in the incompatible programming language, the network-based storage system can provide comprehensive access for the document to the user. Additionally, the document application executing the converted macros for the document reduces the waste of computing resources at the client device and/or the network-based storage system, resulting in a decrease in overall system latency and an increase in overall system efficiency.

FIG. 1 illustrates an example system architecture 100, in accordance with implementations of the present disclosure. System architecture 100 (also referred to as "system" herein) includes client devices 102A-N, a data store 110, and a platform 120, each connected to a network 106. In some embodiments, one or more components of system 100 can be included as part of a network-based storage system.

In implementations, network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing content items as well as data structures to tag, organize, and index the content items. Data store 110 may be hosted by one or more storage devices, such as main memory, magnetic or optical storage based disks, tapes or hard drives, NAS, SAN, and so forth. In some implementations, data store 110 may be a network-attached file server, while in other embodiments, data store 110 may be some other type of persistent storage such as an object-oriented database, a relational database, and so forth, that may be hosted by platform 120 or one or more different machines coupled to the platform 120 via network 106.

Client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device can include one or more document applications 104. In some implementations, a document application 104 can be an application that provides a user interface (UI) for users to view, create, or edit content of a file 121, such as an electronic document file (e.g., a text file, a slide presentation file, a spreadsheet file, etc.), an electronic message file (e.g., an e-mail file), an image file, a video file, a multi-media file, etc. For example, the document application 104 may be a web browser that can access, retrieve, present, and/or navigate files 121 served by a web server. The document application 104 may render, display, and/or present the content of a file 121 to a user. In one example, the document application 104 may be a standalone application (e.g., a mobile application or app) that allows users to view, edit, and/or create digital content items (e.g., electronic documents, electronic messages, digital video items, digital images, electronic books, etc.). In some implementations, the document application 104 may be an electronic document platform application for users to generate, edit, and/or upload content for electronic documents on the platform 120. In other or similar implementations, the document application 104 may be an electronic messaging platform application (e.g., an electronic mail (e-mail) application) for users to generate and send messages via platform 120.

In some implementations, the document application 104 may be provided to the client devices 102A-102N by platform 120 (referred to as a compatible document application 104A). Compatible document application 104A can provide a user interface for users to view, create, or edit content of a file 121 in a programming language that is compatible with platform 120. For example, compatible document application 104A can provide a user interface for users to create a file 121 for a document including macros in a JS (JavaScript) programming language, which is compatible with platform 120. In other or similar embodiments, the document application 104 may not be provided by platform 120 (referred to as an incompatible document application 104B). Incompatible document application 104B can provide a user interface for users to view, create, or edit content of a file 121 in a programming language that is not compatible with (e.g., not supported by) platform 120. For example, incompatible document application 104B can provide a user interface for users to create a file 121 for a document including macros in a VBA (Visual Basic for Applications) programming language, which is not compatible with platform 120. Compatible document application 104A and incompatible document application 104B can both enable users to provide a file for a document including macros (either in a compatible or incompatible programming language) to platform 120 for storage at data store 110, in accordance with embodiments described herein.

In some implementations, platform 120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 (e.g., an electronic document, an e-mail message, etc.) and/or provide the file 121 to the user. For example, platform 120 may be an electronic document platform. Platform 120 may allow a user to create, edit (e.g., collaboratively and/or concurrently with other users), access or share with other users an electronic document stored at data store 110. In another example, platform 120 may be an electronic messaging platform (e.g., e-mail platform). The electronic messaging platform may allow a user to create, edit, or access electronic messages (e.g., e-mails) addressed to other users of the electronic messaging platform or users of client devices outside of the electronic messaging platform. Platform 120 can also include a website (e.g., a webpage) or application back-end software that can be used to provide a user with access to files 121.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the platform 120.

Platform 120 can include a macro conversion engine 124. As mentioned previously, document application 104 can provide a user interface that enables a user to create, edit, access, or share a file 121 stored at data store 110. In some instances, a client device 102A-N can transmit a file 121 for a document that includes macros 122 to platform 120 for storage at data store 110. A macro 122 refers to a user-created automated task that is performed for a document by document application 104 as the document is accessed via client device 102A-N. In some instances, macro 122 is in a programming language that is incompatible with programming language associated with platform 120. For example, file 121 can include a macro 122 in a VBA programming language, which is incompatible with a JS programming language associated with platform 120. Macro conversion engine 124 can convert macros 122 from an incompatible programming language into a compatible programming language, enabling the execution of macros 122 when a document including the macros 122 is accessed via platform 120. Further aspects pertaining to macro conversion engine 124 are described with respect to FIG. 2 below.

In an illustrative example, a first client device 102A can generate a document for a file including macros 122 via incompatible document application 104B. The macros 122 of file 121 can be in a programming language that is incompatible with platform 120. The first client device 102A can transmit the file 121 to platform 120 for storage at data store 110. Macro conversion engine 124 can convert macros 122 of file 121 from the incompatible programming language to a programming language that is compatible with platform 120, in accordance with embodiments described with respect to FIG. 2. In response to macro conversion engine 124 converting macros 122 of file 121 to a compatible programming language, platform 120 can store file 121 at data store 110. Platform 120 can receive a request to access file 121 via a compatible document application 104A of a client device 102. In some embodiments, platform 120 can receive the request from the first client device 102A to access file 121 via compatible document application 104A. In other or similar embodiments, platform 120 can receive the request from a second client device 102N to access file 121 via compatible document application 104A. Platform 120 can retrieve file 121 from data store 110 and can transmit the file 121 to the requesting client device 102. Compatible document application 104A can provide a user of the requesting client device with access to file 121 and can perform operations associated with macros 122 in the compatible programming language of file 121.

As illustrated in FIG. 1, macro conversion engine 124 can be included as part of platform 120, in some embodiments. In such embodiments, a processing device of platform 120 can perform one or more operations associated with macro conversion engine 124. In other or similar embodiments, macro conversion engine 124 can be included as part of document application 104 or another application hosted by client device 102A-N. In such embodiments, a processing device of client device 102A-N can perform the one or more operations associated with macro conversion engine 124.

Figure 2:
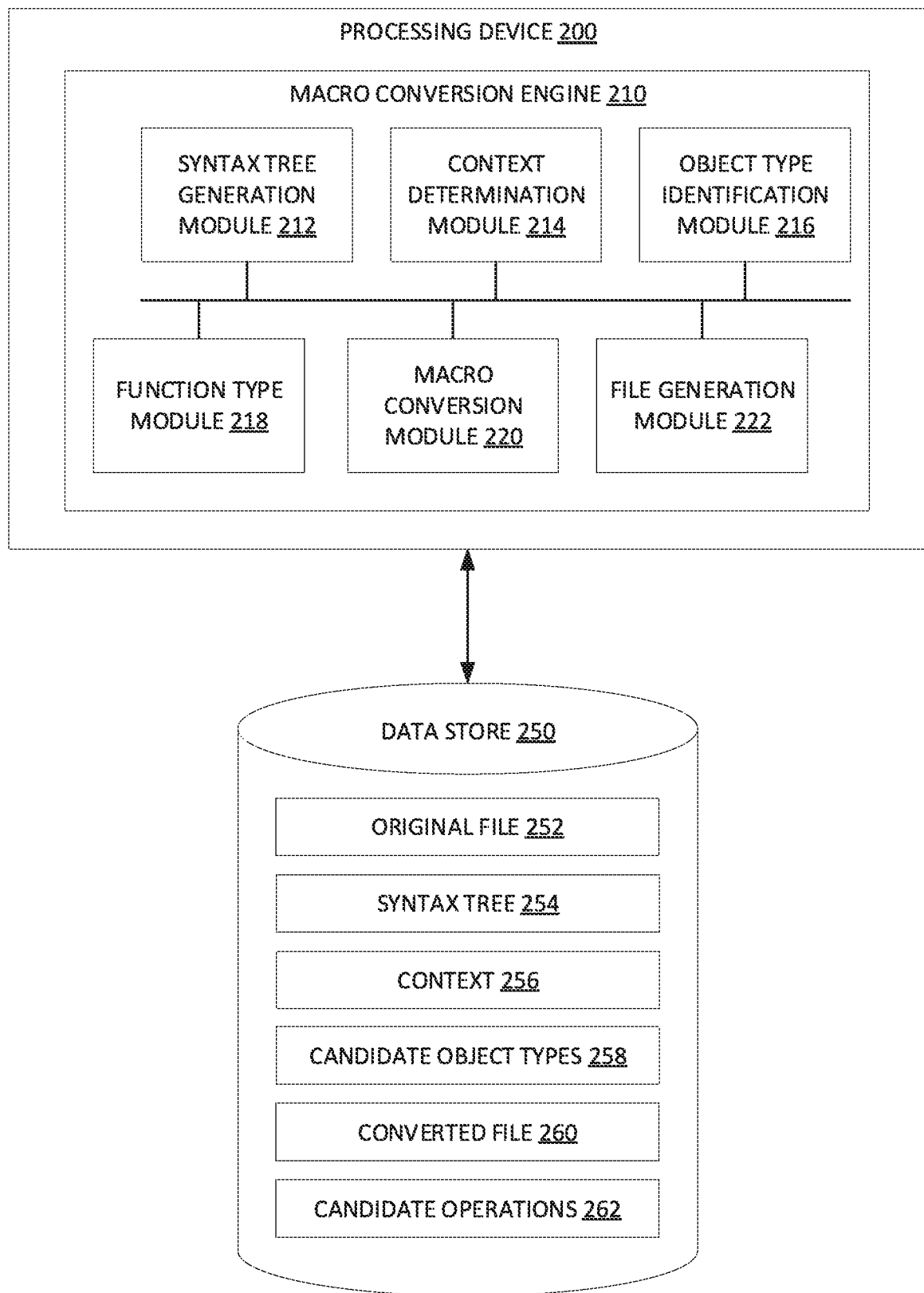
FIG. 2 illustrates an example macro compatibility engine, in accordance with implementations of the present disclosure.

FIG. 2 illustrates an example macro conversion engine 210, in accordance with implementations of the present disclosure. In some embodiments, macro conversion engine 210 can be macro conversion engine 124 described with respect to FIG. 1. As previously described, macro conversion engine 210 can convert a macro from a first programming language that is incompatible with a network-based storage system (e.g., platform 12) into a second programming language that is compatible with the network based storage system.

Macro conversion engine 210 can include a syntax tree generation module 212, a context determination module 214, an object type identification module 216, a function type module 218, a macro conversion module 220, and a file generation module 222. Macro conversion engine 210 can be connected to a data store 250 that is configured to store an original file 252, syntax tree 254, a context 256, a set of candidate objects 258, a converted file 260, and a set of candidate operations 262. In some embodiments, data store 250 can correspond to data store 110 of FIG. 1.

As described previously, macro conversion engine 210 can operate on a processing device for a network-based storage system (e.g., platform 120). In such embodiments, a client device (e.g., client device 102A of FIG. 1) can transmit a file (referred to as the original file 252) for a document to the network-based storage system for storage at data store 250. In other or similar embodiments, macro conversion engine 210 can operate on a processing device for the client device. In such embodiments client device can access original file 252 from a memory of the client device. Original file 252 can include one or more macros defining operations to be performed for the document of original file 252 by a document application 104 at a client device (e.g., client device 102A, client device 102N, etc.).

In some embodiments, the operations included in the macro of original file 252 can include one or more functions to be performed for objects in the first programming language. An object refers to an instance of a class. A class defines initial values for objects of the class and functions (i.e., a series of one or more operations) to be performed with respect to the objects of the class. In one example, original file 252 can be a spreadsheet document and object referenced in an operation of a macro for original file 252 can be a cell-type object. A summation function defined by the class for the cell-type object can include one or more operations performed to calculate a sum of values associated with two or more cell-type objects.

Figures 3A, 3B:
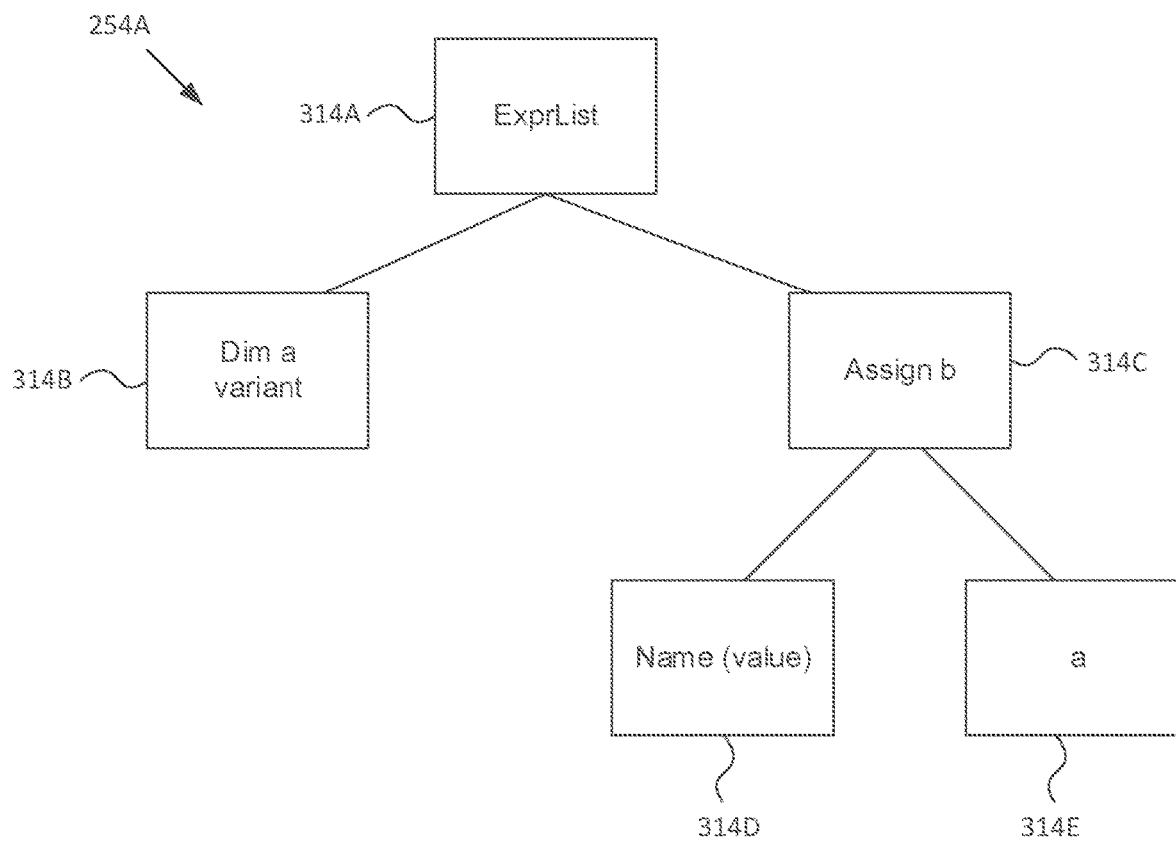
FIGS. 3A-3D illustrate converting a macro for a document in a first programming language to a second programming language, in accordance with implementations of the present disclosure.

FIG. 3A illustrates example operations of a macro of original file 252, in accordance with some implementations of the present disclosure. As illustrated in FIG. 3A, a first operation 310 includes a statement to define an object "a" as a variant type object. A variant type object refers to an object that is associated with multiple object types (e.g., a string, a Boolean, an integer, a user-created object type, etc.). A second operation 312 includes a statement to set an object "b" equal to a value of object "a". Second operation 312 can set object "b" equal to the value of object "a" by calling a function (i.e., a .value function) that is configured to determine the value of object "a" at the instance that the function is called. As first operation 310 defines object "a" as a variant type object, object "a" can be any type of object at the time the function is called.

Referring back to FIG. 2, in response to platform 120 receiving original file 252, syntax tree generation module 212 can generate a syntax tree 254 for macros in original file 252. Syntax tree 254 can be a representation of a syntactic structure of the programming language for the macros of the original file 252 (i.e., an incompatible programming language). FIG. 3B illustrates an example syntax tree 254A for operations 310 and 312 of the macros of original file 252, in accordance with some implementations of the present disclosure. One or more nodes 314 of syntax tree 254A correspond to a construct (e.g., an object, a function, etc.) included in the macro for original file 252. In some embodiments, syntax tree generation module 212 can generate syntax tree 254A by parsing original file 252 to identify one or more operations (e.g., operation 310, operation 312) for macros in original file 252. Syntax tree generation module 212 can associate portions of each identified operation to a particular construct (e.g., an object, a function, etc.) and generate syntax tree 254A based on the associated constructs. As illustrated in FIG. 3B, syntax tree 254A includes a root node (e.g., node 314A), assignment nodes (e.g., nodes 314B and 314C), function nodes (e.g., node 314D), and object nodes (e.g., node 314E). It should be noted that syntax tree 254A is an example syntax tree and other syntax trees with other or similar configurations can be generated by syntax tree generation module 212.

Context determination module 214 can determine a semantic context 256 for each object referenced in a node 314 of syntax tree 254. A semantic context 256 for an object refers to a property associated with the object based on the meaning of the object. For example, a semantic context 256 for an object can indicate whether the object corresponds to a single type of object or multiple types of objects. In some embodiments, context determination module 214 can determine a semantic context 256 for an object based on a definition for the object or how the object is used or referenced in the original programming language. For example, context determination module 214 can determine the context 256 for the object based on a definition for the object in the macro of the original file 252. In another example, context determination module 214 can determine that an object is used in an if/else statement (i.e., "if x occurs with respect to the object, perform operation y, else, perform operation z") defined for a macro in original file 252. Context determination module 214 can determine the context 256 for the object based on the if/else statement.

Object type identification module 216 can identify a type for the object based on the determined semantic context 256. Object type identification module 216 can identify the type for the object based on the definition for the object, in some embodiments. In accordance with the previous example, in response to context determination module 214 determining the object is used in an if/else statement, object type identification module 216 can identify a Boolean object type for the object based on the determined semantic context 256. Syntax tree generation module 212 can associate the determined object type with a node of syntax tree 254 corresponding with the object.

In some embodiments, object type identification module 216 cannot identify a single object type associated with an object of a macro for original file 252. For example, context determination module 214 can determine that the object is a variant type object and therefore corresponds with multiple object types. In another example, context determination module 214 can determine that the object corresponds to multiple different object types and context determination module 214 is not able to determine a specific type for the object in accordance with performance conditions for the network-based storage system. In such embodiments, object type identification module 216 can identify a set of candidate objects types 258 that may correspond with the object.

In some embodiments, object type identification module 216 can identify the set of candidate object types 258 based on the function that the macro invokes for the object. Object type identification module 216 can reference a data structure (e.g., a library) that indicates each type of object that can be invoked for a particular function included in a macro in a particular programming language. The data structure can be stored in data store 250 or in another data store (e.g., connected to platform 120 or client device 102A-N). In one example, original file 252 can be a file for a spreadsheet document. Macros of original file 252 can include operations for a summation function configured to determine a summation of the values of one or more cells of the spreadsheet document. The summation function can receive, as an input, a cell-type object, a row-type object, or a column-type object. In response to context determination module 214 determining that the object corresponds to multiple different types of objects, object type identification module 216 can reference a data structure that indicates each type of object that can be invoked for the summation function. For example, object type identification module 216 can identify an entry of the data structure that is associated with the summation function and extract from a field of the identified entry an indication that the summation function can receive the cell-type object, the row-type object, or the column-type object as an input. Object type identification module 216 can store the set of identified object types as candidate object types 258 at data store 250.

In other or similar embodiments, object type identification module 216 can identify the set of candidate object types 258 based on other macros included in original file 252. For example, object type identification module 216 can identity one or more additional macros of original file 252 that define a type for the object. Object type identification module 216 can determine the defined type for the object in each additional macro in accordance with embodiments herein and include the determined types in the set of candidate object types 258. Object type identification module 216 can identify the set of candidate object types 258 for an object using other techniques not included in the present description. In response to object type identification module 216 identifying the set of candidate object types 258, syntax tree generation module 212 can associate the set of candidate object types 258 with the node 314 of syntax tree 254. For example, object type identification module 216 can determine the set of candidate object types 258 for object "a" referenced in node 314E can include a cell-type, a row-type, or a column-type. Syntax tree generation module 212 can generate a mapping between the set of candidate object types 258 for object "a" and node 314E of syntax tree 254A and store the generated mapping in data store 250.

Function type module 218 can parse through syntax tree 254 and determine whether each function referenced in a node 314 of syntax tree 254 is a default function. A default function refers to one or more sets of operations that are performed with respect to an object when a particular function is not explicitly called for the object during execution of the macro of original file 252. Further aspects regarding default functions are described with respect to FIGS. 4A-C.

Macro conversion module 220 can convert operations for macros in an incompatible programming language to operations in a compatible programming language. Macro conversion module 220 can identify, using syntax tree 254, an operation for a macro of original file 252. In some embodiments, the operation can correspond to an object that is referenced during performance of the operation. Macro conversion module 220 can identify, based on an object type associated with the object, an operation of the compatible programming language that corresponds with the operation of the incompatible programming language.

As previously described, an object referenced by a node 314 of syntax tree 254 can be associated with a set of candidate object types 258 instead of with a single object type. In such embodiments, macro conversion module 220 can identify multiple sets of operations of the compatible programming language that are associated with the set of candidate object types. 258 For example, node 314B is associated with an operation of the incompatible programming language that defines an object "a" as a variant type object. Operation type identification module 216 can determine that object "a" is associated with a set of candidate object types 258 including a cell-type, a column-type, and a row-type, in accordance with previously described embodiments. Macro conversion module can identify operations in the compatible programming language that defines object "a" as a cell-type object, a column-type object, and a row-type object.

In response to macro conversion module 220 identifying corresponding operation(s) of the compatible programming language, syntax tree generation module 212 can generate nodes for the corresponding operations in the compatible programming language. In some embodiments, syntax generation module 212 can add the generated nodes to the syntax tree including the nodes for operations in the incompatible programming language (i.e., syntax tree 254A). In other or similar embodiments, syntax generation module 212 can add the generated nodes to a syntax tree including nodes for corresponding operations in the compatible programming language.

Figure 3C:
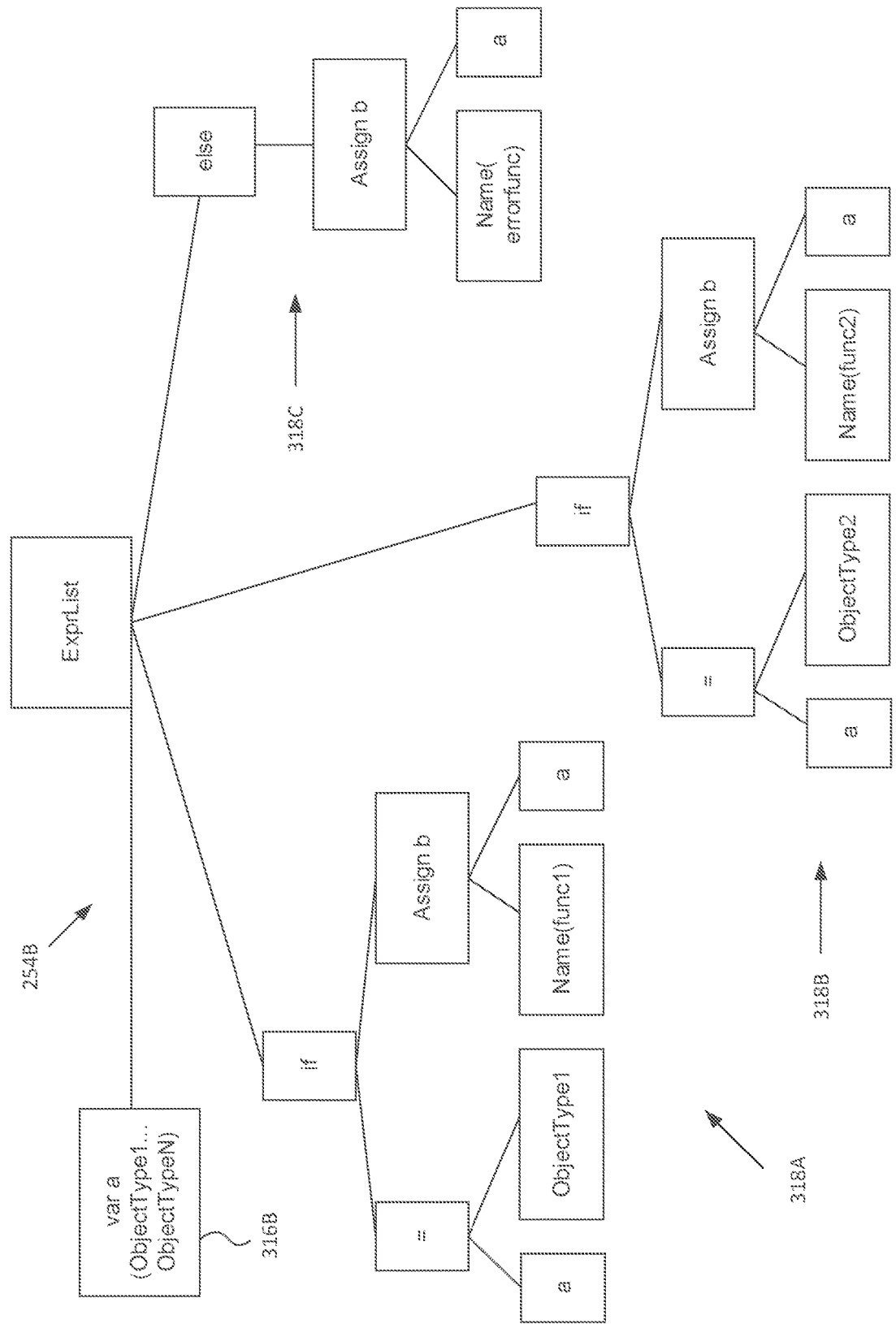

FIG. 3C illustrates a syntax tree 254B for the corresponding operations in the compatible programming language, in accordance with some implementations of the present disclosure. As illustrated in FIG. 3C, one or more nodes 316 of syntax tree 254B correspond to a construct (e.g., an object, a function, etc.) corresponding to an operation of the macro in original file 252. For example, node 316B, which references operations to assign various object types to object "a," corresponds to operations referenced in node 314B of syntax tree 254A.

In some embodiments, multiple sets of nodes 316 of syntax tree 254B can correspond to operations referenced in nodes 314 of syntax tree 254A. For example, as described previously, object "a" can correspond to a set of candidate object types 258. A first set 318A of nodes 316 of syntax tree 254B can reference an operation performed for an object having a first object type of the set of candidate object types 258 in the compatible programming language that corresponds to an operation in the incompatible programming language referenced by node 314D of syntax tree 254A. As seen in FIG. 3C, the first set 318A of nodes 316 references an operation in the compatible programming language to set object "b" equal to the value of object "a" by calling a first function (i.e., func1), if object "a" has a first object type (i.e., ObjectType1). A second set 318B of nodes 316 can reference another operation performed for the object having a second object type of the set of candidate object types 258 in the compatible programming language that corresponds to the operation referenced by node 314D of syntax tree 254A. As seen in FIG. 3C, the second set 318B of nodes 316 references an operation in the compatible programming language to set object "b" equal to the value of object "a" by calling a second function (i.e., func2), if object "b" has a second object type (i.e., ObjectType2). A third set 318C of nodes 316 can reference a default operation performed for the object if the object "a" does not have an object type that corresponds with any object type referenced by node 316B. As seen in FIG. 3C, an error function ("errorfunc") is called during the assignment of object "b" to the value of object "a" if object "a" does not have an object type referenced by node 316B.

Referring back to FIG. 2, file generation module 222 can generate a file for the document that is converted to the compatible programming language (referred to as the converted file 260). File generation module 222 can parse syntax tree 254 and generate converted file 260 based on the nodes of syntax tree 254 for objects and operations in the compatible programming language. For example, file generation module 222 can parse syntax tree 254A and/or syntax tree 254B and identify nodes for operations in the compatible programming language. File generation module 222 can generate converted file 260 based on identified nodes for operations in the compatible programming language. By generating converted file 260 based on nodes for operations in the compatible programming language, file generation module 222 can generate macros for the document of converted file 260 that can be executed by a compatible document application (e.g., document application 104A) running on a client device (e.g., 102A-N).

Figure 3D:
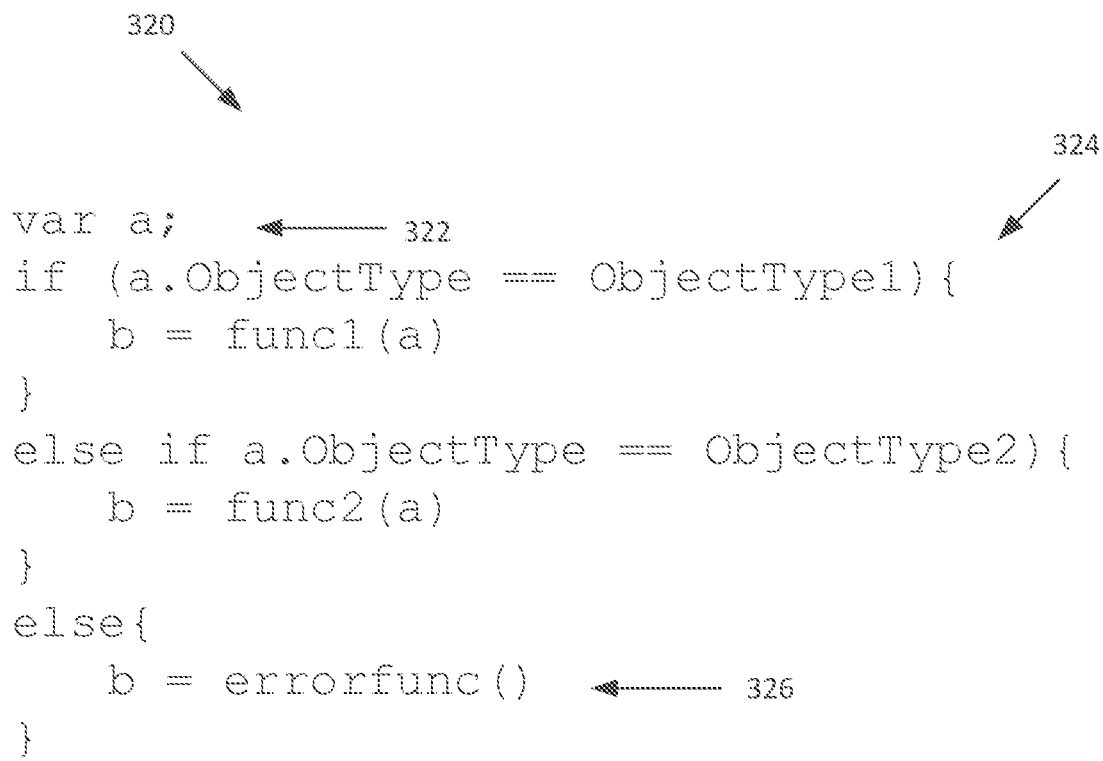

FIG. 3D illustrates a portion 320 of converted file 260 including macros in the compatible programming language, in accordance with some implementations of the present disclosure. The portion 320 of converted file 260 includes a first operation 322 that includes a statement to initialize object "a." The portion 320 of converted file 260 also includes a second operation 324 that includes statements to set object "b" to the value of object "a" based on different object types for object "a." The portion 320 of converted file 260 also includes a third operation 326 that includes a statement to initiate an error function if the type for object "a" does not correspond to an object type referenced in the second operation 324.

In some embodiments, file generation module 222 can generate converted file 260 and store converted file 260 in response to a user providing an indication that the document for converted file 260 is to be stored at data store 250. For example, file generation module 222 included in macro conversion engine 210 operating on a client device (e.g., client device 102) can generate converted file 260 prior to client device 102 transmitting the file for storage at platform 120. In other or similar embodiments, syntax tree generation module 212 can generate nodes for syntax tree 254 in the compatible programming language. Client device 102 can transmit the generated nodes for syntax tree 254 to platform 120 for storage at data store 250. File generation module 222 include in macro conversion engine 210 operating on a processing device for platform 120 can generate converted file 260 in response to receiving the generated nodes for syntax tree 254. In other or similar embodiments, file generation module 222 can generate converted file 260 in response to platform 120 receiving a request from a client device 102 to access the document of converted file 260. For example, syntax generation module 212 (operating on the client device 102 and/or a processing device for platform 120) can generate nodes for the syntax tree 254 in the compatible programming language, in accordance with embodiment described herein. Macro conversion engine 210 can store the generated nodes for syntax tree 254 at data store 250. In response to receiving a request to access a document for the file associated with syntax tree 254, file generation module 222 can generate converted file 260 and store converted file 260 at data store 250. Platform 120 can provide access to the document of converted file 260 in accordance with the request.

As described previously, some functions referenced by nodes 314 of syntax tree 254 can be default functions. A default function refers to one or more sets of operations that are performed with respect to an object when a particular function is not explicitly called for the object during execution of the macro of original file 252. As described above, objects of a macro can be associated with a class of objects. The class of objects can define a set of initial values for each object and one or more default functions that are to be performed with respect to the object when a particular function is not explicitly called for the object during execution of the macro of original file 252. The specific default function that is to be invoked in a macro is determined based on the type of the object that is referenced in the macro.

In an illustrative example, objects of a macro for original file 252 can be associated with a class named "myCollection." The "myCollection" class can define default sets of operations that are to be performed based on the type of object referenced in the macro. For instance, the "myCollection" class can define a set of operations for an Item( ) function that is to be performed when an object having an integer object type is referenced by the macro even though the Item( ) function is not explicitly called in the macro. The "myCollection class can also define a set of operations for a Listing( ) function that is to be performed when an object having a string object type is referenced by the macro even though the Listing( ) function is not explicitly called in the macro.

Figures 4A, 4B:
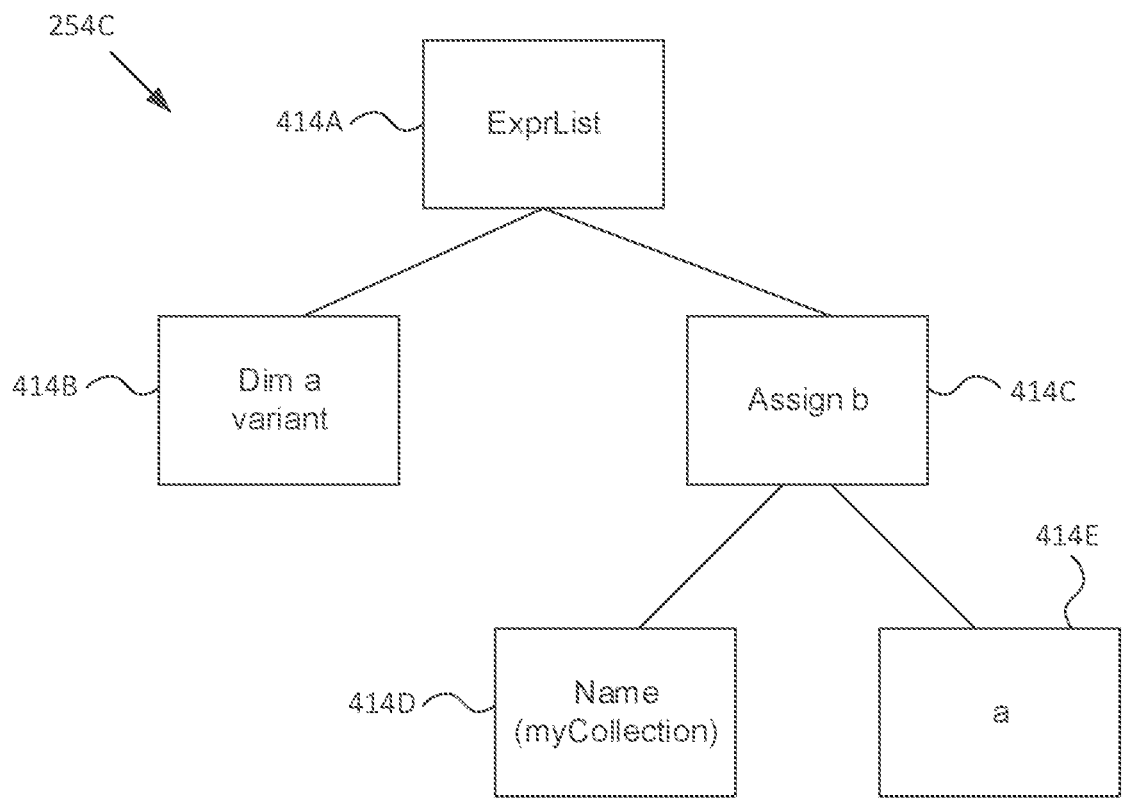
FIGS. 4A-4C illustrate converting another macro for a document in a first programming language to a second programming language, in accordance with implementations of the present disclosure.

FIG. 4A illustrates example operations that include statements that reference a default function, in accordance with some implementations of the present disclosure. As illustrated in FIG. 4A, a first operation 410 includes a statement to define an object "a" as a variant type object, in accordance with previously described embodiments. A second operation 412 includes a statement to set object "b" equal to a value of object "a" by calling a default function of "myCollection" to be performed with respect to object "a." The default set of operations that will be performed for the default function depends on the type of object associated with object "a." As object "a" is defined as having a variant object type, a different default set of operations can be performed with respect to object "a" during run-time, depending on the object type associated with object "a" when the macro calls the default function of "myCollection."

FIG. 4B illustrates an example syntax tree 254C for operations 410 and 412, in accordance with some implementations of the present disclosure. Syntax tree generation module 212 can generate syntax tree 254C in accordance with embodiments described herein. Function type module 218 can parse through syntax tree 254C and determine whether each function referenced in a node 414 of syntax tree 254C is a default function. For example, function type module 218 can parse through syntax tree 254C and determine that node 414D references a default function because the function referenced by node 414D is not explicitly called by the macro in original file 252 when the macro invokes the default function.

In response to determining that node 414D references a default function, function type module 218 can identify the set of default operations for the default function that is invoked by the macro. In some embodiments, function type module 218 can determine the set of default operations based on a type of the object that is referenced in the macro. For example, function type module 218 can parse through syntax tree 254C and determine that object "a" is passed to the "myCollection" class when the macro invokes a default function. Object type identification module 216 can determine the type for object "a," in accordance with embodiments described herein. Function type module 218 can identify the set of default operations of the "myCollection" class that is invoked for an object having the determined type for object "a." For example, function type module 218 can reference a file for the document (i.e., original file 252 or another file not shown) that includes the definitions for the "myCollection" class. Function type module 218 can identify the set of default operations that corresponds with the type for object "a" based on the file for the document. In another example, function type module 218 can reference a data structure (e.g., a library) that defines default sets of operations for the "myCollection" class and identify the default set of operations that corresponds with the type for object "a."

In some embodiments, object "a" can correspond to a single object type. In such embodiments, function type module 218 can identify the single default set of operations that is invoked for the "myCollection" class and associate the identified function with node 414D. In other or similar embodiments, object "a" can correspond to multiple object types. For instance, object "a" can be associated with a set of candidate object types 258, as previously described. In such embodiments, function type module 218 can identify a set of candidate operations 262 that each correspond to a default set of operations for a particular object type of the set of candidate object types 258. For example, object type identification module 216 can determine that a set of candidate object types 258 for object "a" includes a cell-type, a row-type, and a column-type. Function type module 218 an identify a first default set of operations of the "myCollection" class that is to be invoked for a cell-type object, a second default set of operations of the "myCollection" class that is to be invoked for a row-type object, and a third default set of operations of the "myCollection" class that is to be invoked for a column-type object. Function type module 218 can store the identified default sets of operations as a set of candidate operations 262 at data store 250, as previously described.

In response to identifying the operations of the default functions for node 414D, function type module 218 can associate the operations of the default function and/or the set of candidate operations for the default function with node 414D. For example, function type module 218 can generate a mapping between the set of candidate operations 262 and node 414D and store the generated mapping at data store 250, in accordance with previously described embodiments.

Figure 4C:
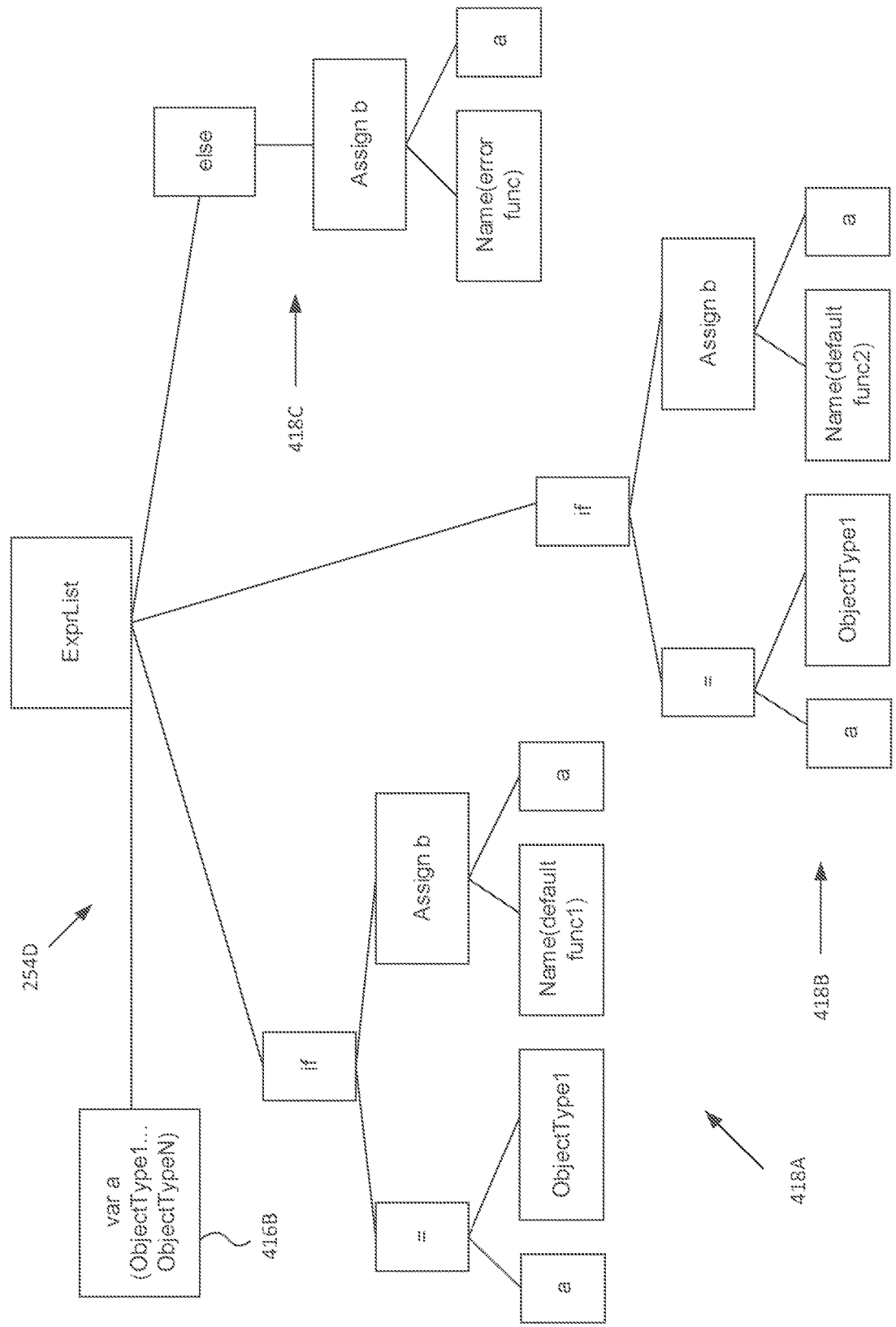

Syntax tree generation module 212 can generate nodes for syntax tree 254 that reference corresponding operations of the default functions in the compatible programming language, as previously described. In some embodiments, syntax tree generation module 212 can add the generated nodes to the syntax tree including nodes for operations in the incompatible programming language, in accordance with previously described embodiments. In other or similar embodiments, syntax tree generate module 212 can include the generated nodes in a syntax tree including nodes for operations in the compatible programming language. FIG. 4C illustrates a syntax tree 254D for the corresponding operations in the compatible programming language, in accordance with some implementations of the present disclosure. As illustrated in FIG. 4C, one or more nodes 416 of syntax tree 254D correspond to a construct (e.g., an object, a function, etc.) corresponding to an operation of the macro in original file 252. For example, node 416B, which references operations to assign various object types to object "a," corresponds to operations referenced in node 414B of syntax tree 254C.

In some embodiments, multiple sets of nodes 416 of syntax tree 254D correspond to operations referenced in nodes 414 of syntax tree 254C. For example, object "a" can correspond to a set of candidate object types 258 and a default function of the "myCollection" class is performed for each of the set of candidate object types 258. A first set 418A of nodes 416 references an operation in the compatible programming language to set object "b" equal to the value of object "a" by performing operations associated with a first default set of operations (i.e., operations for defaultfunc1) if object "a" has a first object type (i.e., ObjectType1). A second set 418B of nodes 416 references another operation in the compatible programming language to set object "b" equal to the value of object "a" by performing operations associated with a second default set of operations (i.e., operations for defaultfunct2) if object "a" has a second object type (i.e., ObjectType2). A third set 418C of nodes 416 references another operation in the compatible programming language to initiate an error function (i.e., errorfunc) during the assignment of object "b" to the value of object "a" if object "a" does not have an object type referenced by node 416B. File generation module 222 can generate a file for the document in the compatible programming language based on syntax tree 254D, in accordance with previously described embodiments.

As described previously, platform 120 can provide a client device 102 with access to a document including macros converted from the incompatible programming language to the compatible programming language. A document application can perform a set of operations in the compatible programming language for an object based on a type for the object during execution of the macro. For example, at a first instance, the object referenced by an executing macro can be associated with a cell type. The document application can perform a first set of operations for the object in the compatible programming language, where the first set of operations corresponds with a cell type object. At a second instance, the object referenced by the executing macro can be associated with a column type. The document application can perform a second set of operations for the object in the compatible programming language, where the second set of operations corresponds with the column type object.

Figure 5:
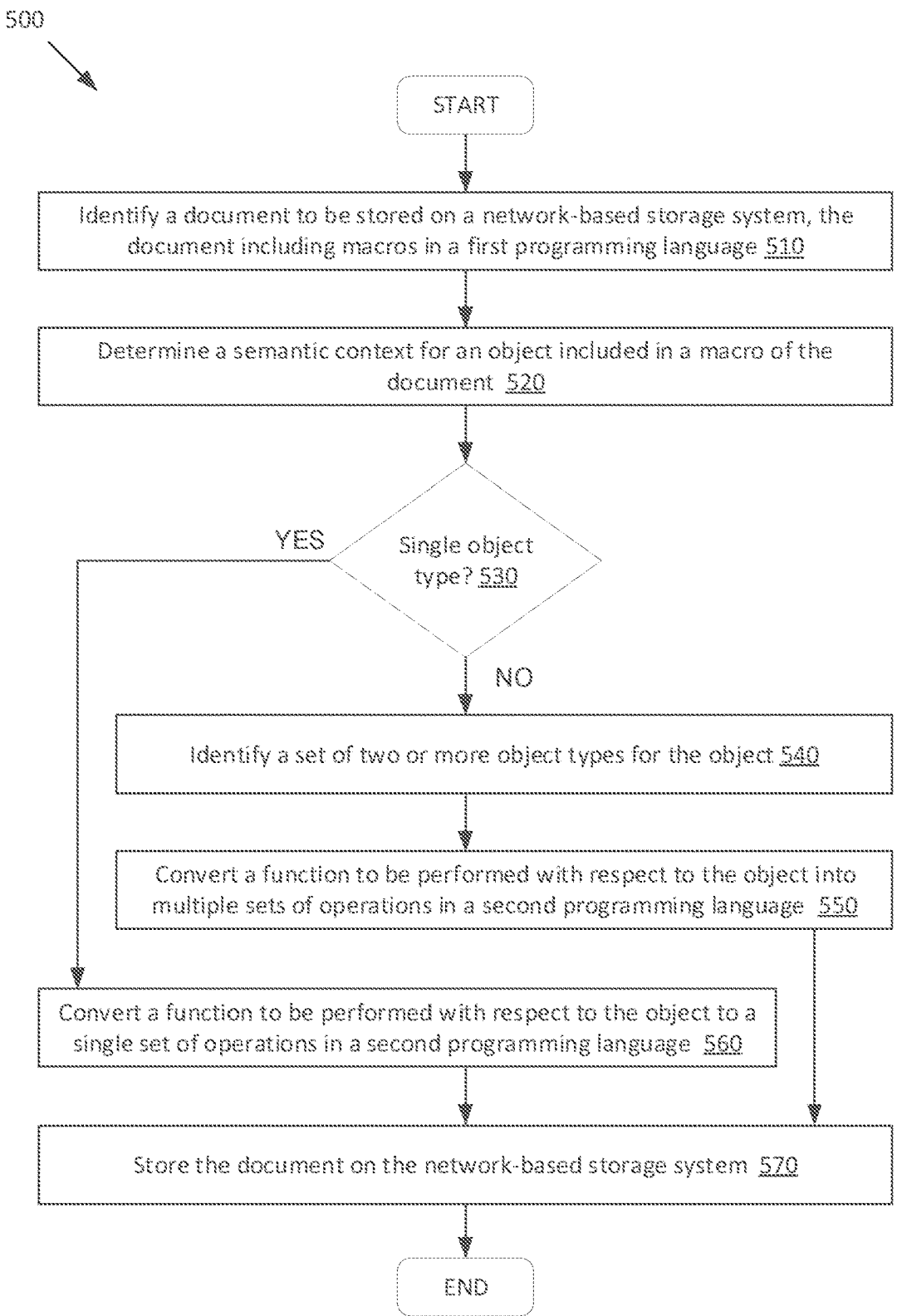
FIG. 5 depicts a flow diagram of a method to convert a macro from a programming language to a second programming language, in accordance with implementations of the present disclosure.

FIG. 5 depicts a flow diagram of a method 500 to convert a macro from a first programming language to a second programming language, in accordance with implementations of the present disclosure. In some embodiments, method 500 can be performed by macro conversion engine 124 described with respect to FIG. 1. In other or similar embodiments, method 500 can be performed by a client-based application (e.g., document application 104) that runs on a client device 102A-N. The client-based application may be executed by a processing device by the client device 102A-N.

For simplicity of explanation, method 500 of this disclosure is depicted and described as a series of acts. However, acts in accordance with this disclosure can occur in various orders and/or concurrently, and with other acts not presented and described herein. Furthermore, not all illustrated acts may be required to implement method 500 in accordance with the disclosed subject matter. In addition, those skilled in the art will understand and appreciate that method 300 could alternatively be represented as a series of interrelated states via a state diagram or events. Additionally, it should be appreciated that method 500 disclosed in this specification is capable of being stored on an article of manufacture to facilitate transporting and transferring such method to computing devices. The term "article of manufacture," as used herein, is intended to encompass a computer program accessible from any computer-readable device or storage media.

At operation 510, processing logic (e.g., of server 140, of client device 102A-N, etc.) can identify a document to be stored on a network-based storage system. The document can be created using a first document processing application that uses a first programming language that is incompatible with the network-based storage system. For example, the document can be created using a first document application that uses a VBA programming language. The network-based storage system can be configured to provide users with access to documents in a JS programming language. The document can include one or more macros in the first programming language.

As described previously, in some embodiments, processing logic of method 500 can reside on a processing device for a network-based storage system. In such embodiments, processing logic can identify the document to be stored on the network-based storage system by receiving, from a first client device connected to the network-based storage system, the document including the one or more macros in the first programming language. In other or similar embodiments, processing logic of method 500 can reside on a processing device for a client device connected to the network-based storage system. In such embodiments, processing logic can identify the document to be stored on the network-based storage system by retrieving the document including the one or more macros in the first programming language of the client device.

In some embodiments, the processing logic can parse the one or more macros of the document into a syntax tree in the first programming language. The syntax tree can include a set of nodes that each correspond to a respective object included in the macro or a respective function to be performed with respect to the object.

At operation 520, processing logic can determine a semantic context for an object included in a macro of the document. The macro can define a function to be performed with respect to the object. In some embodiments, the function can be a default function, in accordance with embodiments described herein.

In some embodiments, processing logic can determine the semantic context for the object by identifying a definition and/or an indication of use for the object. In other or similar embodiments, processing logic can determine the semantic context for the object by determining that a respective definition or a respective indication for the use of the object cannot be identified. For example, processing logic can determine that multiple definitions or multiple uses for the object are included in the macro for the document, therefore, a respective definition or respective indication for the use of the object cannot be identified.

At operation 530, processing logic can determine, based on the semantic context for the object, whether the object corresponds to a single object type or to multiple object types. Responsive to processing logic determining the object corresponds to a single object type, method 500 can proceed to operation 560. At operation 560, processing logic can convert the function defined in the macro into a set of operations associated with a single object type in a second programming language. In some embodiments, the second programming language is compatible with the network-based storage system. Responsive to processing logic determining the object corresponds to a single object type, method 300 can proceed to operation 540.

At operation 540, processing logic can identify a set of two or more candidate object types for the object. As described above, the function of the macro in the first programming language can be a default function, in some embodiments. In such embodiments, in response to identifying the set of two or more candidate object types for the object, processing logic can identify multiple sets of operations each corresponding to a default set of operations performed for the default function in the first programming language. Each default set of operations can be associated with a candidate object type of the set of two or more candidate object types for the object that is referenced during execution of the macro.

In some embodiments, processing logic can identify a set of operations corresponding to a default set of operations performed for the default function in the first programming language by identifying an entry in a data structure associated with the macro that corresponds to a candidate object type of the set of candidate object types. Processing logic can extract a default set of operations to be performed for the default function based on the corresponding candidate object type from the identified entry.

At operation 550, processing logic can convert a function to be performed with respect to the object into multiple sets of operations in a second programming language. As described above, the second programming language is compatible with the network-based storage system.

As described above, processing logic can parse the macros of the document into a syntax tree in the first programming language. In such embodiments, processing logic can convert the function defined in the macro into multiple sets of operations by generating a set of nodes for a syntax tree in the second programming language. Each of the set of nodes corresponds to a candidate object type of the set of object types or a set of operations of the multiple sets of operations to be performed for the object.

At operation 570, the processing logic can store the document on the network based-storage system. In embodiments where the operations of method 500 are performed by processing logic of platform 120, processing logic can store the document at a data store connected to platform 120 (e.g., data store 110). In embodiments where the operations of method 500 are performed by processing logic of a client device, processing of the client device can store the document on the network-based storage system by transmitting the document in the second programming language to the platform 120 for storage at data store 110. In some embodiments, the processing logic can store the document including the multiple sets of operations in the second programming language by storing the syntax tree in the second programming language in a memory of the network-based storage system.

Figure 6:
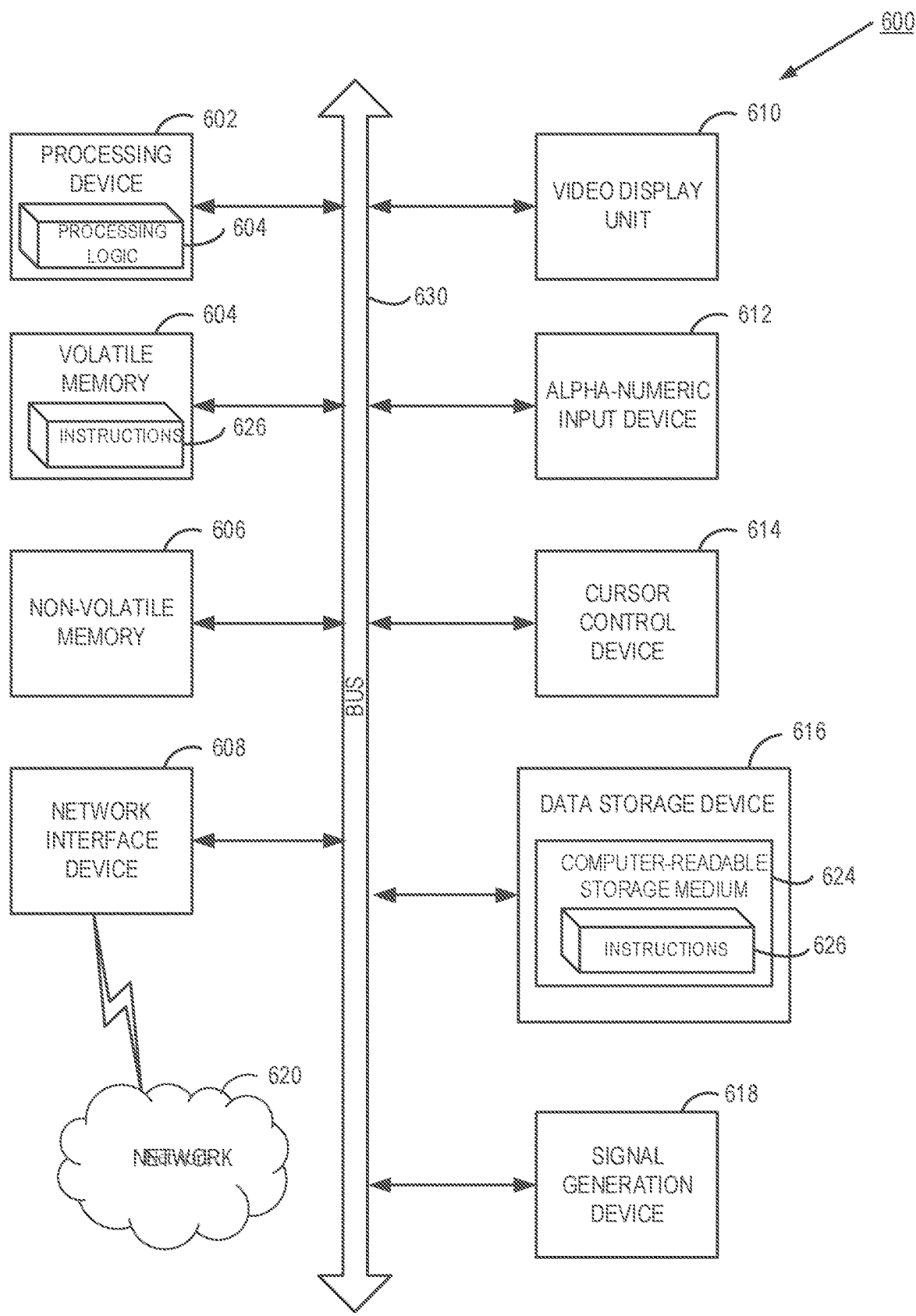
FIG. 6 is a block diagram illustrating an exemplary computer system, in accordance with implementations of the present disclosure.

FIG. 6 is a block diagram illustrating an exemplary computer system 600, in accordance with implementations of the present disclosure. The computer system 600 can be part of platform 120 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for converting macros in a first programming language to a second programming language) embodying any one or more of the methodologies or functions described herein. The instructions can also reside, completely or at least partially, within the main memory 404 and/or within the processor 602 during execution thereof by the computer system 400, the main memory 404 and the processor 602 also constituting machine-readable storage media. The instructions can further be transmitted or received over a network 430 via the network interface device 408.

In one implementation, the instructions 605 include instructions for converting macros in a first programming language to a second programming language. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   identifying a document to be stored on a network-based storage system, wherein the document comprises one or more macros in a first programming language;
   identifying an object referenced by a function defined by a macro of the one or more macros of the document;
   converting the function into one or more sets of operations represented in a second programming language, wherein each set of operations corresponds to one of one or more candidate object types associated with the object, and wherein at least one of the one or more sets of operations is to be performed with respect to the object responsive to receiving an indication of a corresponding candidate object type for the object during execution of the macro; and
   storing, on the network-based storage system, the document comprising the one or more sets of operations represented in the second programming language.

2. The method of claim 1, wherein the first programming language is not supported by the network-based storage system, and wherein the second programming language is supported by the network-based storage system.

3. The method of claim 1, further comprising:
   determining a semantic context for the object referenced by the function; and
   identifying the one or more candidate object types associated with the object based on the determined semantic context.

4. The method of claim 1, further comprising:
   parsing the one or more macros of the document into a syntax tree in the first programming language, the syntax tree comprising a plurality of nodes each corresponding to at least one of a respective object included in the macro or a respective function to be performed with respect to the object.

5. The method of claim 4, wherein converting the function into one or more sets of operations comprises generating a set of nodes for a syntax tree in the second programming language, wherein each of the set of nodes corresponds to at least one of a candidate object type of the one or more candidate object types or a set of operations of the one or more sets of operations to be performed for the object.

6. The method of claim 5, wherein storing the document comprising the one or more sets of operations represented in the second programming language comprises storing the syntax tree in the second programming language in a memory of the network-based storage system.

7. The method of claim 1, wherein the function corresponds to a default function for the macro in the first programming language, and wherein the method further comprises:
   responsive to identifying the one or more candidate object types for the object, identifying the one or more sets of operations, wherein each of the one or more sets of operations corresponds to a default set of operations performed for the default function in the first programming language, and wherein each default set of operations is associated with a candidate type of object of the one or more candidate object types that is referenced during execution of the macro.

8. The method of claim 7, wherein identifying a set of operations of the one or more sets of operations comprises:
   identifying, in a data structure associated with the default function of the macro in the first programming language, an entry corresponding to a candidate object type of the one or more candidate object types; and
   extracting, from the identified entry, a default set of operations to be performed for the default function based on the corresponding candidate object type.

9. The method of claim 1, wherein identifying the document to be stored on the network-based storage system comprises receiving, from a first client device connected to the network-based storage system, the document comprising the one or more macros in the first programming language, and wherein storing the document comprising the one or more sets of operations represented in the second programming language comprises storing the document in a memory for the network-based storage system.

10. A system comprising
a memory; and
a processing device coupled to the memory, the processing device to perform operations comprising:
identifying a document to be stored on a network-based storage system, wherein the document comprises one or more macros in a first programming language;
identifying an object referenced by a function defined by a macro of the one or more macros of the document;
converting the function into one or more sets of operations represented in a second programming language, wherein each set of operations corresponds to one of one or more candidate object types associated with the object, and wherein at least one of the one or more sets of operations is to be performed with respect to the object responsive to receiving an indication of a corresponding candidate object type for the object during execution of the macro; and
storing, on the network-based storage system, the document comprising the one or more sets of operations represented in the second programming language.

11. The system of claim 10, wherein the first programming language is not supported by with the network-based storage system, and wherein the second programming language is supported by the network-based storage system.

12. The system of claim 10, wherein the processing device is to perform operations further comprising:
determining a semantic context for the object referenced by the function; and
identifying the one or more candidate object types associated with the object based on the determined semantic context.

13. The system of claim 10, wherein the processing device is to perform operations further comprising:
parsing the one or more macros of the document into a syntax tree in the first programming language, the syntax tree comprising a plurality of nodes each corresponding to at least one of a respective object included in the macro or a respective function to be performed with respect to the object.

14. The system of claim 13, wherein converting the function into one or more sets of operations comprises generating a set of nodes for a syntax tree in the second programming language, wherein each of the set of nodes corresponds to at least one of a candidate object type of the one or more candidate object types or a set of operations of the one or more sets of operations to be performed for the object.

15. The system of claim 14, wherein storing the document comprising the one or more sets of operations represented in the second programming language comprises storing the syntax tree in the second programming language in a memory of the network-based storage system.

16. The system of claim 10, wherein the function corresponds to a default function for the macro in the first programming language, and wherein the operations further comprise:
responsive to identifying the one or more candidate object types for the object, identifying the one or more sets of operations, wherein each of the one or more sets of operations corresponds to a default set of operations performed for the default function in the first programming language, and wherein each default set of operations is associated with a candidate type of object of the one or more candidate object types that is referenced during execution of the macro.

17. A non-transitory computer readable storage medium comprising instructions for a server that, when executed by a processing device, cause the processing device to perform operations comprising:
identifying a document to be stored on a network-based storage system, wherein the document comprises one or more macros in a first programming language;
identifying an object referenced by a function defined by a macro of the one or more macros of the document;
converting the function into one or more sets of operations represented in a second programming language, wherein each set of operations corresponds to one of one or more candidate object types associated with the object, and wherein at least one of the one or more sets of operations is to be performed with respect to the object responsive to receiving an indication of a corresponding candidate object type for the object during execution of the macro; and
storing, on the network-based storage system, the document comprising the one or more sets of operations represented in the second programming language.

18. The non-transitory computer readable storage medium of claim 17, wherein the first programming language is not supported by the network-based storage system, and wherein the second programming language is supported by the network-based storage system.

19. The non-transitory computer readable storage medium of claim 17, wherein the processing device is to perform operations further comprising:
determining a semantic context for the object referenced by the function; and
identifying the one or more candidate object types associated with the object based on the determined semantic context.

20. The non-transitory computer readable storage medium of claim 17, wherein the processing device is to perform operations further comprising:
parsing the one or more macros of the document into a syntax tree in the first programming language, the syntax tree comprising a plurality of nodes each corresponding to at least one of a respective object included in the macro or a respective function to be performed with respect to the object.

* * * * *